Patented Aug. 4, 1931

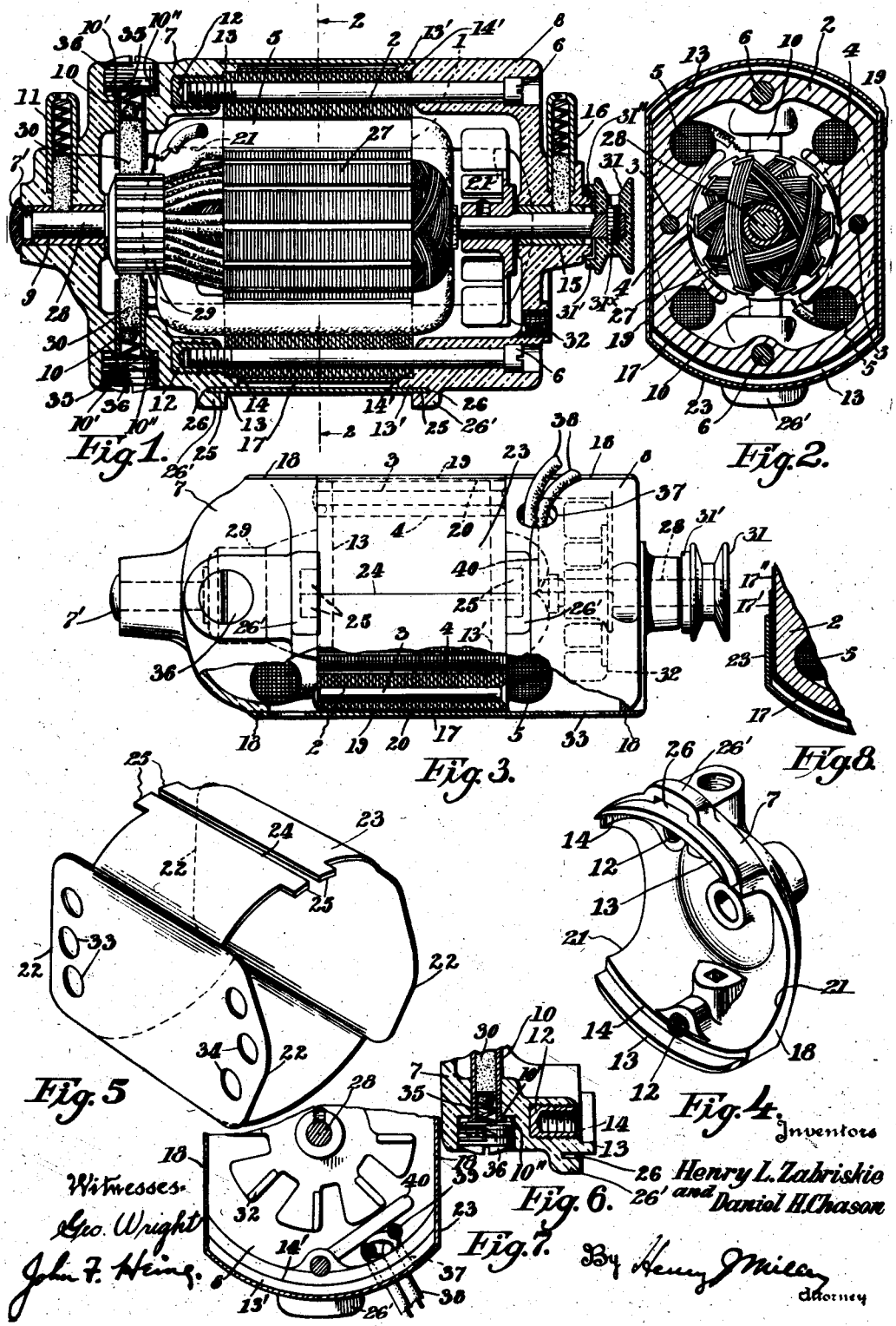

1,817,597

UNITED STATES PATENT OFFICE

HENRY L. ZABRISKIE, OF WESTFIELD, AND DANIEL H. CHASON, OF ELIZABETH, NEW JERSEY, ASSIGNORS TO THE SINGER MANUFACTURING COMPANY, OF ELIZABETH, NEW JERSEY, A CORPORATION OF NEW JERSEY

ELECTRIC MOTOR

Application filed June 29, 1929. Serial No. 374,779.

This invention relates to electric motors, more particularly of the small or fractional horsepower type commonly used for driving household appliances, hand-tools and the like, or for purposes where the user is likely to come in contact with the exterior of the motor or the appliance associated with it. In these cases, with motors as ordinarily constructed, a breakdown of the usual or primary system of insulation charges the frame and shaft of the motor electrically, as well as the frame of the device or machine on which the motor is mounted or to which it may be metallically connected, thereby subjecting the user to the annoyance or danger of an electric shock.

According to the present improvement, the motor is provided with a secondary system of insulation completely protecting the exposed parts of the motor, as well as the device or appliance on which the motor is mounted or to which it is connected, from an electrically charged motor field-frame or armature-frame occasioned by a breakdown of the usual primary system of motor-insulation.

The invention is more particularly concerned with sewing machine motors which are flattened in accordance with the disclosure of the Diehl et al. Patent No. 1,488,234, of March 25, 1924, for mounting upon the metal frame or standard of a sewing machine gooseneck in the restricted space between the standard and the adjacent wall of the cover of a carrying case or of the folding cover leaf of a drop-head cabinet.

A feature of the invention is the provision of a secondarily insulated motor of minimum overall width by insulating the laminated field-frame with a thin sheet of material of high dielectric strength and protecting such insulation from mechanical injury by a thin sheet-metal casing which is insulated from all parts of the motor subject to electrification by a breakdown of the usual or primary system of insulation.

Another feature of the invention is the securing of an insulated split sleeve or casing about the laminated field-frame of the motor, between the motor end-covers, without the use of fastening screws and without increasing the width of the motor. The construction permits the casing to be made up from sheet-stock and obviates the use of an expensive tube.

The invention further comprises the use of end-covers and a driving pulley of molded insulating material and the provision of a flange on the pulley in overlapping relation with an extension of the motor shaft bearing.

In the accompanying drawings Fig. 1 is a longitudinal vertical section through an electric motor embodying the invention. Fig. 2 is a transverse vertical section on the line 2—2, Fig. 1. Fig. 3 is a bottom plan view of the motor. Fig. 4 is a perspective view of one of the motor end-covers. Fig. 5 is a perspective view of the field-frame casing. Fig. 6 is a fragmentary sectional view of the lower portion of the left end-cover of the motor, as shown in Fig. 1. Fig. 7 is a fragmentary inside elevation of the other motor end-cover, and Fig. 8 is a fragmentary sectional view through the motor-casing.

The motor comprises a field-frame 1 made up from a stack of steel laminations 2 held together by rivets 3 and presenting internally disposed field-poles 4 embraced by field-coils 5. Clamped to the opposite ends of the field-frame 1 by bolts 6 are the end-covers 7, 8 molded from a suitable phenolic condensation product or heat-resisting non-conductor of electricity, such as bakelite. The end-cover 7 has secured to it, in their respective separated and insulated positions the metal bearing-sleeve 9, metal brush-tubes 10, metal oil-cup 11 and nuts 12 for the bolts 6. The end-cover 7 has top and bottom curved ribs 13 affording seats 14 for reception of the field-frame 1. The end-cover 8 has a metal bearing-sleeve 15 and oil-cup 16 and, like the end-cover 7, is formed with top and bottom ribs 13′ affording field-frame seats 14′. Surrounding the field-frame 1 and filling the space between the ribs 13, 13′ is a strip 17 of suitable sheet-strip insulation; the end-covers 7, 8 being cut away along flat parallel planes 18 coincident with the flat sides 19 of the insulating strip 17 lying against the flat sides 20 of the field-frame 1.

The insulating strip 17 may be made from a sheet of paper impregnated with a phenolic condensation product or from a sheet of varnished cambric 17' cemented to a sheet of gray fibre 17'', the gray fibre being nearer to the field-frame, as shown in Fig. 8.

The cutting away of the end-covers along the spaced parallel planes 18 leaves open windows 21 which are closed by the lateral extensions 22 of the sheet-metal casing strip 23 which covers the insulating strip 17 and is not in electrical contact with the field-frame 1.

The casing strip 23 protects the thin insulating strip 17 from mechanical injury and provides an exterior finish for the motor. It also protects the portions of the field-coils exposed by the windows 21, and closes such windows, adding but little to the overall width of the motor which must be kept at a minimum in order that it may be accommodated in the restricted space available in a sewing machine outfit, as explained in said Diehl et al. patent.

The meeting ends 24 of the casing strip 23 are formed with laterally extending tongues 25 which are received in sockets 26 in the lugs 26' on the end-covers 7, 8 during assembly of the parts, no fastening screws or rivets being required to hold the cover 23 in assembled position about the field-frame 1, with its ends 24 meeting at the underside of the motor.

The lugs 26' in which the sockets 26 are formed are on the underside of the motor and effectively retain the casing strip 23 in place without the necessity of in any way enlarging the motor widthwise and without the use of fastening screws or rivets which would destroy the desired insulated relation of the casing 23.

The conventional armature 27 has its shaft 28 journaled in the bearings 9, 15 and its commutator 29 in position to be engaged by the brushes 30 in the brush-tubes 10. The projecting end of the shaft 28 carries a pulley 31 of molded insulating material of the same character as that from which the end-covers are made. The pulley is secured to the shaft by means of the set screw 31× which is threaded through the shaft 28 and enters an aperture in the wall of the shaft-aperture in the pulley 31. The shaft-aperture in the pulley is closed at its outer end to prevent the possibility of the operator touching the shaft.

The inner face of the pulley 31 is formed with an annular rib or flange 31' which overlaps the annular extension 31'' of the bearing support of the end-cover 8. These overlapping circular portions prevent the possibility of accidental contact with the shaft 28 between the end-cover 8 and the pulley 31. The opposite end of the shaft 28 is protected by the plug 7' of molded insulating material which is tightly fitted to the aperture in the end-cover 7 which receives the bearing sleeve 9.

A ventilating fan 32 may be mounted on the shaft 28 to blow air out of the ventilating openings 33 in the casing 23, air being sucked in through the ventilating openings 34 in the casing 23 at the other end of the field-frame 1.

The brushes 30 are backed by brush-springs 35 which, in turn, are backed by the breech-screws 36 of molded insulating material. The breech-screws 36, when screwed home, tightly clamp the flanged outer ends 10' of the brush-tubes 10 against the seats 10'' and hold the brush-tubes against endwise displacement in the end-cover 7.

The end-cover 8 is formed with an aperture 37 for the motor-leads 38 which are customarily knotted at 39 within the aperture 37. To prevent the knot 39 from being pushed into the field of action of the fan 32, the end-cover 8 is formed with a guard rib 40 forming a partition wall between the knot 39 and the fan 32.

It will be seen that all component metallic parts of the motor which are electrified or are subject to electrification by a breakdown of the customary motor-insulation are, in turn, completely protected from accidental contact with the body of the operator by a secondary system of insulation.

Having thus set forth the nature of the invention, what we claim herein is:—

1. An electric motor having a laminated field-frame, end-covers of insulating material secured to the opposite ends of said field-frame, an armature journaled in said end-covers, a strip of thin sheet insulation surrounding said field-frame between said end-covers, and a thin sheet-metal protecting casing strip secured around said insulation strip and insulated from said field-frame.

2. An electric motor having a laminated field-frame, end-covers of molded insulating material secured to the opposite ends of the field-frame and formed with recesses, and a thin insulated casing strip surrounding the field-frame and having its meeting ends formed with laterally extending tongues received in said recesses to hold said meeting ends in juxtaposition.

3. An electric motor having a laminated field-frame, end-covers of molded insulating material secured to the opposite ends of the field-frame and having ribs overlapping the field-frame, a strip of thin sheet insulation surrounding the field-frame between said ribs, and a protecting casing of thin sheet-metal surrounding said field-frame and covering said insulation strip and seated upon said ribs, said casing being insulated from said field-frame.

4. An electric motor having a field-frame, end-covers secured to said field-frame, an armature having a shaft journaled in said end-covers a fan on said armature-shaft within one of said end-covers, said one of said end-covers being formed with an aperture for the motor lead-in wires, and a guard on said end-cover spaced inwardly from said aperture and between the latter and said fan for preventing engagement of the lead-in wires with the fan.

5. An electric motor having a field-frame, end-covers of molded insulating material secured to said field-frame, means for insulating the exterior of said field-frame between said end-covers, a motor-shaft journaled in said end-covers, and a pulley of insulating material secured to and insulating the end of said motor-shaft, said pulley and the adjacent end-cover having overlapping circular portions.

In testimony whereof, we have signed our names to this specification.

HENRY L. ZABRISKIE.
DANIEL H. CHASON.